Oct. 21, 1941.  W. H. GRAY  2,260,221
DUCT JOINT CONSTRUCTION
Filed May 25, 1940  2 Sheets-Sheet 2
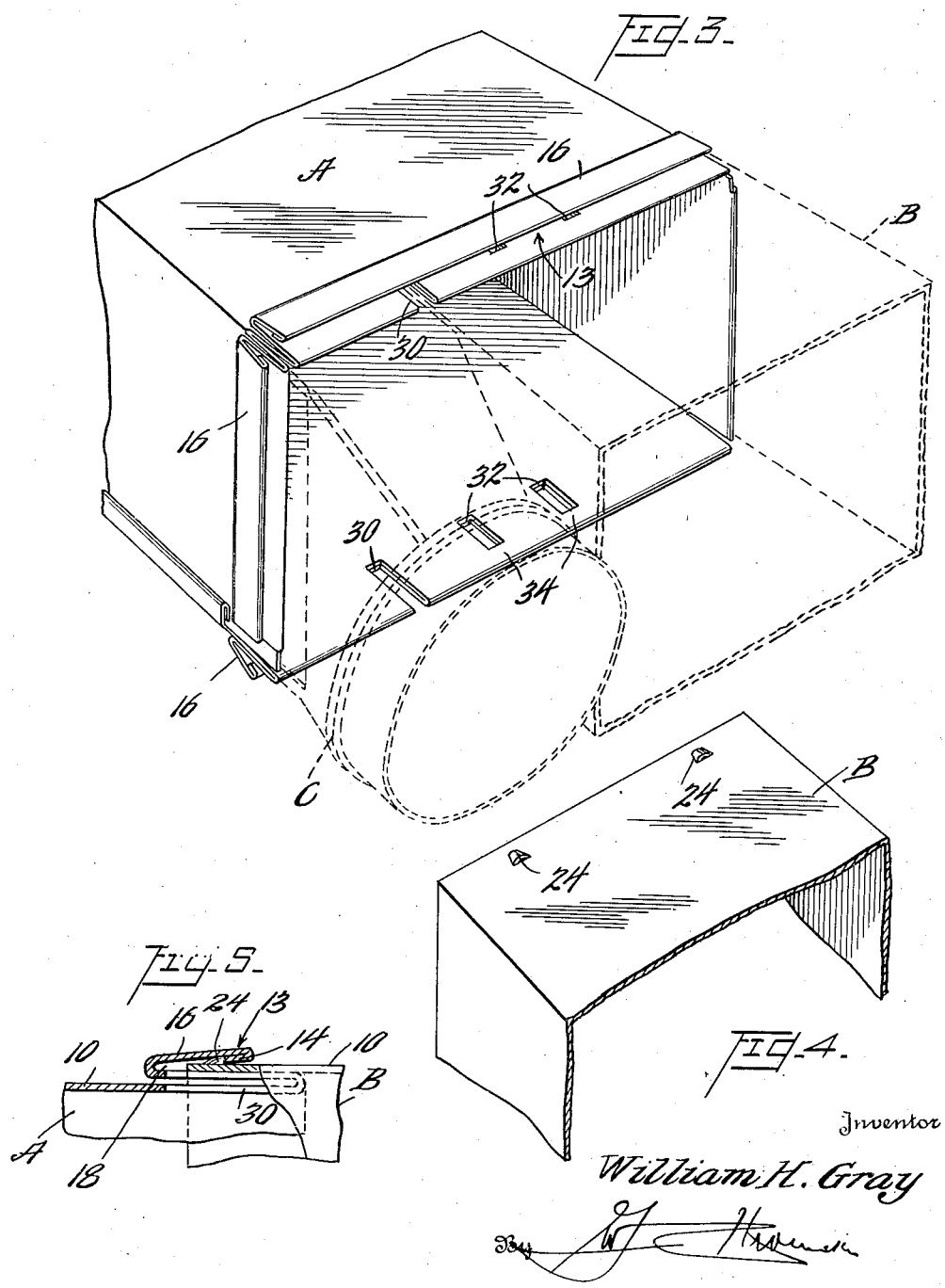
Inventor
William H. Gray
By [signature]
Attorney Patented Oct. 21, 1941

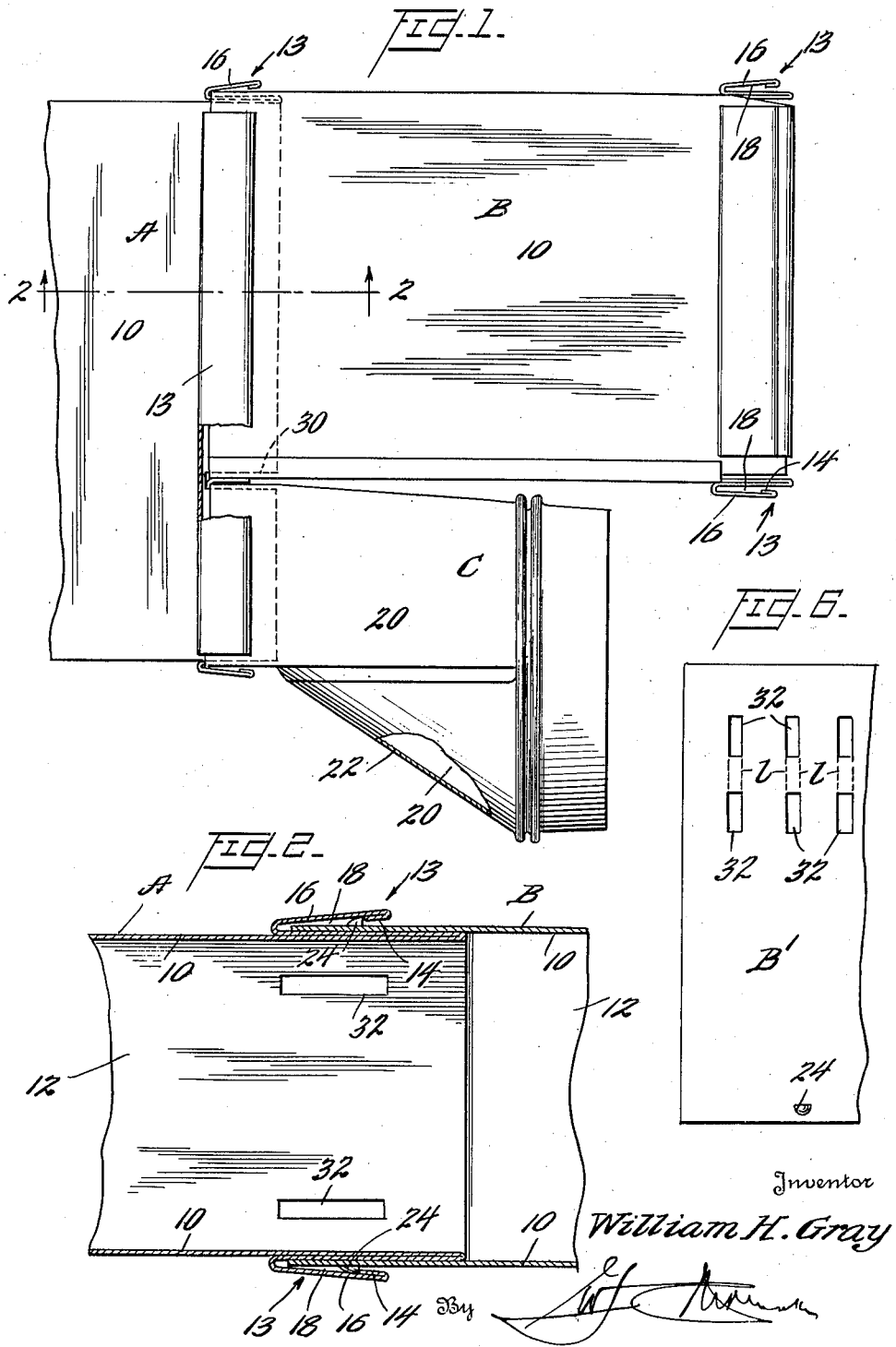

2,260,221

UNITED STATES PATENT OFFICE 2,260,221

DUCT JOINT CONSTRUCTION

William H. Gray, Rochester, N. Y., assignor to Gray Metal Products, Inc., Rochester, N. Y., a corporation of New York Application May 25, 1940, Serial No. 337,274

2 Claims. (Cl. 285—201)

The improved duct joint comprising the present invention is primarily adapted for use in connection with warm air heating and air conditioning installations. The principles of the invention, however, are applicable to other uses and the present duct joint may be employed in connection with all manner of furnace and stove pipe, air ducts and tunnels, etc., particularly where the installations are comprised of sheet metal.

In installations of this character, where a branch is made from a main trunk line, many difficulties are encountered in making the mounting and in providing an air-tight joint at the location of the branch. This is particularly true where the branch or take-off is made at the end of a conduit section and a corresponding reduction in the size of the main trunk line is effected, or where several branches or take-off connections are made at the ultimate end of the main trunk line.

In such instances it has been customary, where installations are made on the job, for the workman to pry the usual external locking cleat provided at one end of each trunk line conduit section outwardly and notch the inner rim of the section at the proper place to provide a clearance for the adjacent rim portions of the branch conduit and reduced trunk line section. Such a method of installation is unsatisfactory, first, in that after the locking cleat has once been bent out of its normal plane it is difficult to again restore it to its original position. Even in an instance where the operator is able to reach the length of the section with a dolly bar to reinforce the locking cleat, the locking cleat cannot be effectively restored to its original position and the resultant joint is frequently unsightly and not air tight. Secondly, unless the locking cleat is bent outwardly at ninety degrees or more from its normal position, the operator is unable to reach with his shears the bottom of the U-shaped retaining pocket or seat provided between the cleat and body of the conduit section and as a consequence the notch thus formed in the installation process is not sufficiently deep to accommodate the edges or rim portions of the branch and reduced trunk line conduit sections.

The present invention is designed to overcome the above-noted limitations that are attendant upon the use of present-day conventional warm air and air conditioning system installations and toward this end contemplates the provision of preformed units which may be quickly and easily assembled on the job in a very secure manner and without the use of tools. Installations made according to the present invention require no bending of the usual locking cleat, and, when assembled, are entirely air-tight and rigid and present no visible evidence of the pre-notching operations resorted to in the manufacture of the units. Furthermore, such installations may be made by unskilled operators with very little or no opportunity for improper assembly of the various parts.

These being the principal objects of the invention, another object thereof is to provide an installation of the character set forth above which may be built up on the job according to the various requirements and conditions imposed by the particular job. A related object is to provide an installation consisting of preformed units which may be constructed according to standard sizes, the units being capable of being fitted together in several different ways and in such a manner that the entire installation is easy to balance.

The provision of an installation of this character which is possessed of no pivoted or other parts which are movable relative to each other, at least insofar as the locking of the sections together is concerned; one which is rugged and durable and which consequently is unlikely to get out of order and which will withstand rough usage, and which may be manufactured at a relatively low cost, and one which otherwise is well adapted to perform the services required of it, are further desiderata that have been borne in mind in the production and development of the present invention.

Other objects and advantages of the invention not at this time particularly enumerated will become more readily apparent as the nature of the invention is better understood.

In the accompanying two sheets of drawings, there is disclosed for illustrative purposes one embodiment of the present invention. In these drawings:

Figure 1 is a fragmentary side elevational view partly in section of an air duct installation manufactured and assembled according to the principles of the present invention.

Figure 2 is a sectional view taken substantially along the line 2—2 of Figure 1.

Figure 3 is a fragmentary perspective view of the air duct installation.

Figure 4 is a fragmentary perspective view partly in section of a conduit or duct section illustrating certain locking features employed in connection with the invention.

Figure 5 is a fragmentary sectional view taken transversely through an interlocking seam existing between adjacent duct sections.

Figure 6 is a fragmentary plan view of a blank from which one of the units comprising the present invention is formed.

In the drawings, like characters of reference are employed to designate like parts throughout.

It will be understood that the drawings are more or less schematic in their representation for the purpose of illustrating a typical or preferred embodiment of the invention. For example, purely for illustrative purposes, the improved duct joint construction is shown in connection with a rectangular main trunk line including an initial trunk line section A and a trunk line section B of reduced cross-sectional area and an adaptor boot C having a connection for a round branch line conduit. It will be understood, however, that the improved duct joint construction is capable of use in all manner of installations and is adaptable for use in connection with longway and shortway elbow connections, angle connections, increaser or reducer connections, damper sections, register units, adaptor and transformer connections, and a great variety of other connections regardless of the cross-sectional contour of these parts.

Referring now to Figures 1 and 2, the main trunk line or distributor duct sections A and B each includes longitudinal and transverse walls 10 and 12 which, at one end of the section, are formed with generally S-shaped seams 13 that are formed by first bending the margins of the walls during formation of the section from its blank as at 14 (Figure 5) to provide a locking bead, then bending the outer edge regions of the walls back upon themselves to provide a cleat portion 16, and finally giving the walls a reverse bend so that a U-shaped seat or pocket 18 is provided, into which the adjacent edges of one or more main or branch line ducts or units such as the adaptor boot C may be inserted, as will be described presently.

In Figure 1 the adjacent edges of three walls 10, 10, 12 of the main trunk line section B are inserted into the respective pockets 18 of the trunk line section A, while at the same time the adjacent edges of two longitudinal walls 20, 20 and one transverse wall 22 of an adaptor boot C are inserted into their respective pockets 18 with the inner transverse walls 12, 22 of the sections B and C, respectively, occupying positions in substantial contiguity.

A plurality of locking protuberances 24 are formed on the various walls of the sections B and C adjacent the juncture with the section A and are adapted to extend behind the locking bead as shown in Figure 2, so that once the sections are assembled, they are locked in position. The locking protuberances may be formed by a stamping and pressing operation on the metal of the walls of the various sections.

In order to accommodate the adjacent and contiguous transverse edges of the walls 12 and 22, a pair of opposed open-ended slots 30 are provided through the two inner folds of the longitudinal seams 13 of the section A, the slots extending from the rim of the section A to the bottom of the pockets 18.

In the manufacture of the sections A, B and C or of other units such as angle pieces, elbows, damper sections or units, register sections or units and the like, accommodations for a plurality of pairs of the slots 30 are provided for by forming a plurality of pairs of spaced, axially aligned rectangular closed-end slots 32 (Figure 6) in the blank B' from which the section or unit is formed. After the blank B' has been bent to final shape, the slots 32 of each pair come into register as shown in Figure 3, leaving a bridge portion 34 which may be cut away by the operator prior to assembling the various sections. If desired, the original blank B' may be scored along lines 1—1 (Figure 6) connecting the slots 32 to further facilitate tearing off or removal of the bridge portions 34.

In order to accommodate the engineering requirements of various types of installations, the blank is so formed that the various pairs of opposed composite slots 32 will occur in the completed unit at spaced regions which are standard distances removed from the corners of the units. For example, these slots 32 may be provided both in the longitudinal walls and in the transverse walls of the units at 4, 8 and 12 inch distances inward from the corners of the larger sizes of main trunk line conduit sections. For intermediate size trunk line conduit sections, the slots may be formed at 4 and 8 inch distances inward from the corners, while, for small sizes of main trunk line conduit sections, 2 and 4 inch distances may be employed. Irrespective of these details in the manufacture of the units, however, the essential features of the invention are at all times preserved.

It is to be noted that the operator in cutting the bridge portions 34 from the closed-end slots 32 is not required to bend the cleat portion 16 of the walls away from the normal plane thereof. Neither is it necessary that his shears cut to the bottom of the pocket 18 to secure a deep enough slot for proper interfitting of the parts. Furthermore, should an operator, by a miscalculation or error in judgment, remove the wrong bridge piece 34, no damage will have resulted to the structure as the slot 30 thus formed is concealed in the assembled structure and provides no open vent for escape of air. It is also to be noted that the chance of error in cutting the notches 30 is materially lessened inasmuch as the composite closed-end slots 32 in effect provide a measure of the required distance.

Thus, not only is it unnecessary for the operator to utilize special tools in the installation of the parts, but he is not even required to utilize a measuring rule.

The invention is not to be limited to the exact arrangement of parts shown in the accompanying drawings or described in the specification, as various changes in the details of construction may be resorted to without departing from the spirit of the invention. For example, while the cleat portions 16 are shown as being formed integral with the edge portion of the conduit sections, these cleat portions may, if desired, be separately formed and soldered or otherwise secured in position. Likewise, the double reinforced reversed edge portion of the conduit sections may, if desired, be formed of separate members soldered or otherwise secured to each other. Only insofar as the invention has been particularly pointed out in the accompanying claims is the same to be limited.

What is claimed is:

1. An open-ended sheet metal conduit section of rectilinear configuration in cross section, the walls of said section each having a reverse bend at its edge portion providing an outer locking cleat and an inner double wall reinforced edge portion, said cleats and edge portions forming therebetween pockets adapted to receive therein the walls of adjacent conductor sections in an assembly installation, there being a pair of opposed slots in at least one opposed pair of walls in the reinforced edge portions thereof and spaced inwardly from the edges of said walls by a bridge portion adapted to be cut away prior to the assembly operation to form open-ended notches adapted to receive therein the corners of the adjacent conductor sections.

2. An open-ended sheet metal conduit section of rectangular configuration in cross section, the walls of said section each having a reverse bend at its edge portion providing an outer locking cleat and an inner double wall reinforced edge portion, said cleats and edge portions forming therebetween pockets adapted to receive therein the walls of adjacent conductor sections in an assembly installation, there being a plurality of pairs of opposed slots in each opposed pair of walls in the reinforced edge portions thereof, said slots being spaced inwardly from the edges of said walls by a bridge portion adapted to be cut away prior to the assembly operation to form open-ended notches for the reception therein of the corners of the adjacent conductor sections.

WILLIAM H. GRAY.